US010896073B1

(12) United States Patent
Jain

(10) Patent No.: US 10,896,073 B1
(45) Date of Patent: Jan. 19, 2021

(54) ACTIONABILITY METRIC GENERATION FOR EVENTS

(71) Applicant: Microsoft Technology Licensing, LLC, Redmond, WA (US)

(72) Inventor: Navendu Jain, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/884,938

(22) Filed: May 27, 2020

(51) Int. Cl.
*G06F 13/00* (2006.01)
*G06F 9/54* (2006.01)

(52) U.S. Cl.
CPC .................................. *G06F 9/542* (2013.01)

(58) Field of Classification Search
CPC ........................................................ G06F 9/542
USPC .......................................................... 719/318
See application file for complete search history.

(56) References Cited

U.S. PATENT DOCUMENTS

| 2004/0138933 A1* | 7/2004 | LaComb | G06Q 10/06395 705/7.13 |
| 2014/0208253 A1* | 7/2014 | Pettus | G06T 11/206 715/772 |
| 2020/0021620 A1* | 1/2020 | Purathepparambil | H04L 63/205 |

* cited by examiner

Primary Examiner — Timothy A Mudrick
(74) Attorney, Agent, or Firm — Fiala & Weaver P.L.L.C.

(57) ABSTRACT

Methods, systems, and computer program products are provided for generating an actionability measure for events occurring in a computing environment. A data retriever is configured to receive, in an event management system, an event indication generated in the computing environment regarding an event. In implementations, the event indication includes characteristics relating to the generation of the event. An actionability measure generator is configured to analyze the characteristics relating to the generation of the event. The actionability measure generator generates an actionability measure for the event indication based at least on the analysis of the characteristics, where the actionability measure defines an action level for the event indication. An automated action executor executes an action in the event management system for changing a state of the event indication that is dependent on the generated actionability measure.

20 Claims, 6 Drawing Sheets

ACTIONABILITY METRIC GENERATION FOR EVENTS

BACKGROUND

Cloud services are services (e.g., applications and/or other computer system resources) hosted in the "cloud" (e.g., on servers available over the Internet) that are available to users of computing devices on demand, without direct active management by the users. For example, cloud services may be hosted in data centers or elsewhere, and may be accessed by desktop computers, laptops, smart phones, and other types of computing devices.

In running cloud services, monitoring systems can create a high volume of issues or incidents which need to be handled by corresponding agents, such as on-call engineers. For instance, in an information technology (IT) setting, engineers may receive reports corresponding to various issues relating the performance, security and/or health of the cloud-based services. Responding to each incident in a timely manner is critical since certain incidents may be critical to the operation of one or more systems on the network and/or impact a customer. When an engineer, such as an on-call engineer, receives an incident report or notification (e.g., via a phone call, SMS message, mobile app PUSH notification) through an incident management system, the engineer may need to perform a set of tasks in responding to the incident. For example, an engineer may need to acknowledge the incident, transfer the incident to another group responsible for responding to the incident, perform steps to mitigate the incident, and/or resolve the incident. As a result, continuous tracking of the health of cloud-based services becomes important, as well as responding to any issues that may arise.

Many incidents, however, may be noisy, redundant or have little to no impact on the functioning of a system. Incident management systems may nevertheless escalate the incident to an on-call engineer immediately, even if the incident is not serious in nature. As a result, an unnecessary and/or inefficient utilization of valuable engineer resources may occur, which can disrupt productivity and reduce the amount of time available to address other issues that could be more problematic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for generating an actionability measure for events occurring in a computing environment. A data retriever is configured to receive, in an event management system, an event indication generated in the computing environment regarding an event. In implementations, the event indication includes characteristics relating to the generation of the event. An actionability measure generator is configured to analyze the characteristics relating to the generation of the event. The actionability measure generator generates an actionability measure for the event indication based at least on the analysis of the characteristics, where the actionability measure defines an action level for the event indication. An automated action executor executes an action in the event management system for changing a state of the event indication that is dependent on the generated actionability measure.

In this manner, an actionability measure may be generated that may indicate a level of action associated with the event, thereby enabling a more useful handling and resolution of the event in the event management system. For instance, if an event is determined to comprise a low actionability measure, the event management system may automatically mitigate the event. If an event comprises a high actionability measure, the event management system may cause an agent to be notified immediately. As a result, a more productive handling of events can be achieved in the event management system.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
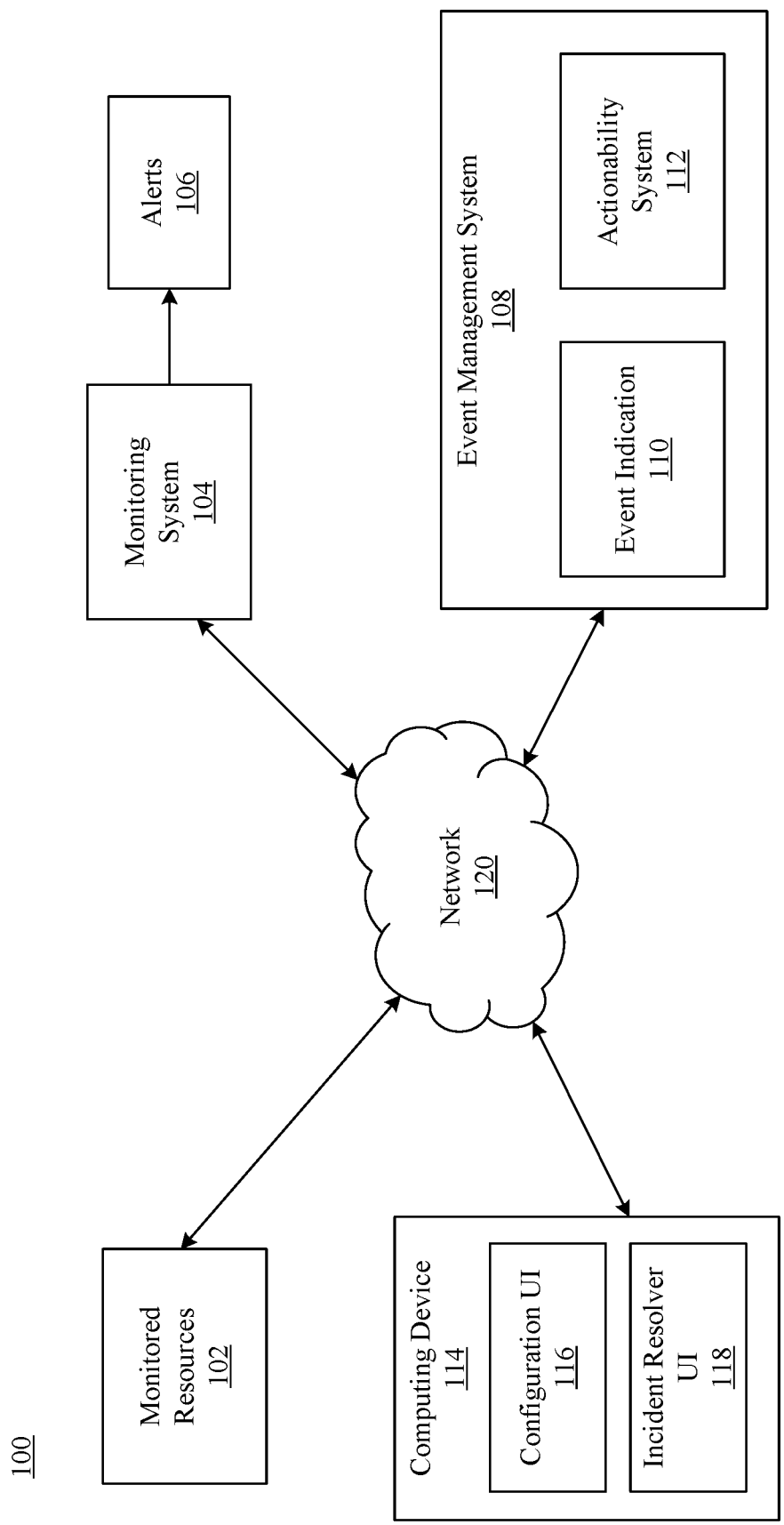
FIG. 1 shows a block diagram of a system for generating an actionability metric for an event occurring in a computing environment, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous example embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In running cloud services, monitoring systems can create a high volume of issues or incidents which need to be handled by corresponding agents, such as on-call engineers. For instance, in an IT setting, engineers may receive reports corresponding to various issues relating the performance and/or health of the cloud-based services. Responding to each incident in a timely manner is critical since certain incidents may be critical to the operation of one or more systems on the network and/or impact a customer. When an engineer, such as an on-call engineer, receives an incident report through an incident management system, the engineer may need to perform a set of tasks in responding to the incident. For example, an engineer may need to acknowledge the incident, transfer the incident to another group responsible for responding to the incident, perform steps to mitigate the incident, and/or resolve the incident. As a result, continuous tracking of the health of cloud-based services becomes important, as well as responding to any issues that may arise.

Given the high volume of alerts (both legitimate alerts and noisy alerts), as well as the inherent redundancy in monitoring, agents may spend significant time and effort analyzing issues to identify resolution actions, only to realize later that an issue did not require any active mitigation actions to be taken by the agent (e.g., the issue was a transient issue that self-healed without any user intervention). Incident management systems may nevertheless escalate these issues, which may have little to no impact on the functioning of a service, to the agent immediately, resulting in unnecessary notification (which can often occur in the middle of the night). As a result, significant time and effort may be wasted, and handling of more important issues that need attention may be delayed.

In addition, where on-call engineers follow a first-in, first-out (FIFO) order of resolving issues assigned to them, resolution of queued issues that may be more important can be delayed even further. Further, even when issues are being analyzed, limited information that is available in the accompanying report (which may be incomplete or not accurate) can result in difficult determinations about the importance of the issue, leading to potentially improper handling of the issue.

Embodiments described herein address these issues by generating an actionability measure for events occurring in a computing environment. A data retriever is configured to receive, in an event management system, an event indication generated in the computing environment regarding an event. In implementations, the event indication includes characteristics relating to the generation of the event. An actionability measure generator is configured to analyze the characteristics relating to the generation of the event. The actionability measure generator generates an actionability measure for the event indication based at least on the analysis of the characteristics, where the actionability measure defines an action level for the event indication. An automated action executor executes an action in the event management system for changing a state of the event indication that is dependent on the generated actionability measure. In this manner, appropriate actions may be carried out for events generated in the computing event that are tailored to the actionability measure, thereby resulting in a more productive handling of events overall.

This approach has numerous advantages, including but not limited to improving the resolution of events in an event management system by, among other things, more efficiently utilizing the overall amount of engineer resources expended to resolve the events and enabling those preserved resources to be used for resolving other more important events. For instance, by improving the productivity of on-call engineers, events arising relating to resources that are being monitored, such as applications, services, etc., may be resolved quicker and more accurately, thereby leading to a reduction in downtime and overall improved performance of those resources. In addition, by implementing techniques described herein, notifications and/or alarms that may be created upon generation of an event may be tailored to the actionability measure generated for the event, such that different types of actions may be taken that are dependent on the generated actionability measure. For instance, a low actionability measure for an event may cause a notification (e.g., a phone call in the middle of the night) to be suppressed to an on-call engineer, resulting in an improved work-life balance and on-call productivity for the engineer.

Furthermore, by generating an actionability measure that may improve the handling of events in an event management system, resources utilized by computing devices that implement such systems will be also be reduced. For example, rather than performing actions that result in event indications to be notified to on-call engineers, which may comprise assigning the event to an individual or team, collecting additional information associated with the event indication, transmitting the event indication and/or a notification associated therewith over a network to an agent, the event management system may automatically change a state of the event indication based on the generated actionability score that results in such actions being avoided. For instance, an event management system may automatically mitigate an event where the actionability measure is low (e.g., suggesting that the event is a transient issue that will self-heal), rendering other resolution actions unnecessary, thereby preserving processing and network resources.

Further, because event indications may be automatically handled in a manner that reduces notification thereof, a reduction in processing resources may be achieved by one or more other systems or computing devices. For example, since a reduced number of notifications for event indications are being generated and/or transmitted, the processing and networking overhead associated with each engineer's access to systems to review and resolve such events may be reduced. Further, because event indications may be handled more accurately based at least on the generated actionability measure, systems which are being monitored may have a reduced downtime due to more timely and accurate resolutions of event indications associated therewith, thus improving the functioning of those monitored systems.

Example embodiments will now be described that are directed to techniques for generating an actionability measure for events occurring in a computing environment. For instance, FIG. 1 shows a block diagram of a system 100 comprising a set of monitored resources 102, a monitoring system 104, an event management system 108, and a computing device 114, each of which may be coupled via one or more networks 120. As illustrated in FIG. 1, monitoring system 104 may generate one or more alerts 106. Event management system 108 includes an event indication 110 and an actionability system 112. Computing device 114 includes a configuration user interface (UI) 116 and an incident resolver UI 118.

Network 120 may comprise one or more networks such as local area networks (LANs), wide area networks (WANs), enterprise networks, the Internet, etc., and may include one or more of wired and/or wireless portions. Monitored resources 102, monitoring system 104, event management system 108, and computing device 114 may communicate with each other via network 120 through a respective network interface. In an embodiment, monitored resources 102, monitoring system 104, event management system 108, and computing device 114 may communicate via one or more application programming interfaces (API). Each of these components will now be described in more detail.

Monitored resources 102 include any one or more resources that may be monitored for performance or any other health reasons. In examples, monitored resources 102 include applications or services that may be executing on a local computing device, on a server or collection of servers, on the cloud (e.g., as a web application or web-based service), or executing elsewhere. For instance, monitored resources 102 may include one or more nodes of a server, virtual machines, databases, software services, customer-impacting or customer-facing resources, or any other resource. As described in greater detail below, monitored resources 102 may be monitored for various performance or health parameters that may indicate whether the resources are performing as intended, or if issues may be present (e.g., excessive processor usage, excessive temperatures, etc.) that may potentially hinder performance of those resources.

Monitoring system 104 may include one or more devices (e.g., computing devices, servers, etc.) for monitoring the performance and/or health of monitored resources 102. For instance, monitoring system 104 may implement any number of monitors (e.g., algorithms or the like) for monitoring processor usage or load, processor temperatures, response times (e.g., network response times), memory usage, facility parameters (e.g., sensors present in a server room), or any other parameter that may be used to measure the performance or health of a resource. In examples, monitoring system 104 may continuously obtain from monitored resources 102 one or more real-time (or near real-time) signals for each of the monitored resources for measuring the resource's performance. In other examples, monitoring system 104 may obtain such signals at predetermined intervals or time(s) of day.

Monitors that are implemented in monitoring system 104 may generate alerts 106 based on signals received from monitored resources 102. In implementations, monitors may identify certain criteria that defines how or when an alert should be generated based on the received signals. For instance, a monitor may comprise a function that obtains the signals indicative of the performance or health of a resource, performance aggregation or other computations or mathematical operations on the signals (e.g., averaging), and compares the result with a predefined threshold. As an illustration, a monitor may be configured to determine whether a central processing unit (CPU) usage averaged over a certain time period exceeds a threshold usage value, and if the threshold is exceeded, an alert may be generated. This example is only illustrative, and monitors may be implemented to generate alerts for any performance or health parameter of monitored resources 102.

Event management system 108 comprises any one or more devices (e.g., computing devices, servers, etc.) for managing the generation of event indication 110 (or multiple event indications) occurring with respect to one or more of monitored resources 102. For instance, monitored resources 102 may include thousands of servers and thousands of user computers (e.g., desktops and laptops) connected to a network. The servers may each be a certain type of server such as a load balancing server, a firewall server, a database server, an authentication server, a personnel management server, a web server, a file system server, and so on. In addition, the user computers may each be a certain type such as a management computer, a technical support computer, a developer computer, a secretarial computer, and so on. Each server and user computer may have various applications and/or services installed that are needed to support the function of the computer. Monitoring system 104 may be configured to monitor the performance and/or health of each of such resources, and generate alerts where a monitor identifies potentially abnormal activity (e.g., predefined threshold values have been exceeded for a given monitor). Event management system 108 may obtain those alerts and generate event indication 110 based on a potential issue with respect to monitored resources 102.

Event indication 110, for instance, may comprise any information relating to any type of event, including but not limited to, events (e.g., incidents) generated as a result of monitoring monitored resources 102. In implementations, event indication 110 may be generated based on alerts 106 as described herein. In other implementations, event indication 110 may also be generated manually by a user (e.g., a user of monitored resources 102). Event indication 110 may include reports that identify contextual information associated with an underlying issue with respect to one or more monitored resources 102. For instance, event indication 110 may include one or more downstream reports that identify alerts or other issues arising in the computing environment, where the alerts or issues may indicate symptoms of a problem with any of monitored resources 102 upstream (e.g., an upstream service, application, etc.). As an illustrative example, an event indication generated by event management system 108 may include a report that any of monitored resources 102 is exceeding a threshold processor usage or a threshold temperature. In another example, an event indication may also indicate (e.g., in the report) a temperature of a physical location of devices, such as a server room. As another illustrative example, an event indication may include a report that a network ping exceeded a predetermined threshold. An event may also include any type of report relating to a customer-impacting issue, where a customer relies on, operates, or otherwise utilizes any of monitored resources 102. However, these are examples only and are not intended to be limiting, and persons skilled in the relevant art(s) will appreciate that an event as used herein may comprise any event or incident occurring on or in relation to a computing device, system or network.

In some examples, event management system 108 may generate an event indication that may be regarded as noise. For instance, noise may be generated based on alerts that do not necessitate any changes be implemented in the computing environment to resolve the event indication. An alert that may be regarded as noise may include, for example, an alert that a CPU has temporarily exceeded a threshold percentage of its processing usage. However, in such a scenario, a user may still need to acknowledge the event indication or transfer the event indication to another team, insert a date/time, mark the event indication with a mitigated status, and resolve the event indication. In other examples, an event may also include any type of transient events that may occur in the computing environment (such as event that is short-lived and may self-heal). As described below, events may be assigned an actionability measure based at least on how actionable the event is, such as by assigning a higher actionability measure for a customer-impacting issue, a lower actionability measure for a transient event, etc. These examples are only illustrative, however, and event management system 108 may generate a variety of other types of event indications that may be regarded as noise, as well as event indications that may require certain types of actions to resolve the event indication.

In some implementations, event management system 108 may optionally implement a correlation engine for correlating together alerts that arise from the same underlying issue. In implementations, the correlation engine may apply a set of correlation rules that define how alerts should be correlated. For instance, different monitors may each generate alerts relating to a common underlying cause, resulting in separate alerts being provided to event management system 108. In other examples, the same monitor may generate alerts for a monitored resource with a particular time window (e.g., a creation time window). In such instances, event management system 108 may determine that the alerts should be grouped together into a single event.

In example embodiments, event management system 108 may correlate incoming alerts to events that have already been created. For instance, a correlation engine may determine, based on application of the set of correlation rules, whether a matching correlation rule is present. If a matching correlation rule is present, the correlation engine may determine if any active event associated with the matching correlation rule exist. If an active event exists, the alert may be correlated to the active event. If no such active event exists, or no matching correlation rule was found, event management system 108 may create a new event. It is understood that these examples are illustrative only, and that event management system 108 may correlate event in any other manner as will be appreciated to those skilled in the relevant arts.

When an event indication is created, event management system 108 may provide event indication 110 to an engineer or team for resolution of the event. Event indication 110 may include contextual data associated with the event, such as details relating to when the event was generated, what monitors detected potentially abnormal activity, or any other data which may be useful in determining an appropriate action to resolve the event. The event indication may be provided in any suitable manner, such as in incident resolver UI 118 that may be accessed by an engineer for viewing details relating to the event as well as identifying actions to resolve the event.

As will be described in greater detail below, actionability system 112 may generate an actionability measure for event indications occurring in a computing environment. The actionability measure may indicate, for instance, an action level for the event indication. For instance, the actionability measure may indicate that an event indication should be acted upon quickly, may be deferred or delayed for resolution at a later time, or may be automatically resolved by event management system 108 (e.g., by automatically mitigating the generated event indication). Accordingly, in examples, actionability system 112 may generate an actionability measure that may be used to perform an action in event management system 108, such as to change a state of the event indication, that is dependent on the generated actionability measure. These examples are illustrative only, and further details regarding actionability system 112 will be described in greater detail below.

Computing device 114 may manage events generated with respect to network(s) 120 or monitored resources 102. Computing device 114 may represent a processor-based electronic device capable of executing computer programs installed thereon. In one embodiment, computing device 114 comprises a mobile device, such as a mobile phone (e.g., a smart phone), a laptop computer, a tablet computer, a netbook, a wearable computer, or any other mobile device capable of executing computing programs. In another embodiment, computing device 114 comprises a desktop computer, server, or other non-mobile computing platform that is capable of executing computing programs. An example computing device that may incorporate the functionality of computing device 114 will be discussed below in reference to FIG. 8. Although computing device 114 is shown as a standalone computing device, in an embodiment, computing device 114 may be included as a node(s) in one or more other computing devices (not shown), or as a virtual machine.

Configuration UI 116 may comprise an interface through which one or more configuration settings of monitoring system 104 and/or event management system 108 may be provided and/or modified for implementation. In some implementations, configuration UI 116 may present one or more dashboards (e.g., reporting or analytics dashboards) or other interfaces for viewing performance and/or health information of monitored resources 102. In some further implementations, configuration UI 116 may provide an interface through which aspects of actionability system 112 may be configured, such as identifying how an actionability measure should be generated (e.g., an identification of parameters to use, weights for each parameter, etc.), assigning actions to perform that are dependent on the actionability measure, or any other aspect described herein. These examples are not intended to be limiting, however, as configuration UI 116 may comprise any UI (such as an administrative console) or configuring aspects of monitoring system 104, event management system 108, actionability system 112, or any other system or component discussed herein.

Incident resolver UI 118 provides an interface for a user to view, manage, and/or respond to event indication 110. Incident resolver UI 118 may also be configured to provide any contextual data associated with each event, such a time that the event indication was generated, identification of the monitors that that led to generation of the event indication, etc. In implementations, incident resolver UI 118 may present an interface through which a user can select any type of resolution action for an event indication. Such resolution actions may be inputted manually, may be generated as recommended actions and provided on incident resolver UI 118 for selection, or identified in any other manner. In some implementations, incident resolver UI 118 generates notifications when a new event arises, and may present such notification on a user interface or cause the notification to be transmitted (e.g., via e-mail, text message, or other messaging service) to an engineer or team responsible for addressing the event indication.

It is noted and understood that implementations are not limited to the illustrative arrangement shown in FIG. 1. Rather, system 100 comprise any number of computing devices and/or servers coupled in any manner. For instance, though monitored resources 102, monitoring system 104, event management system 108, and computing device 114 are illustrated as separate from each other, any one or more of such components (or subcomponents) may be co-located, located remote from each other, may be implemented on a single computing device or server, or may be implemented on or distributed across one or more additional computing devices not expressly illustrated in FIG. 1.

Figure 2:
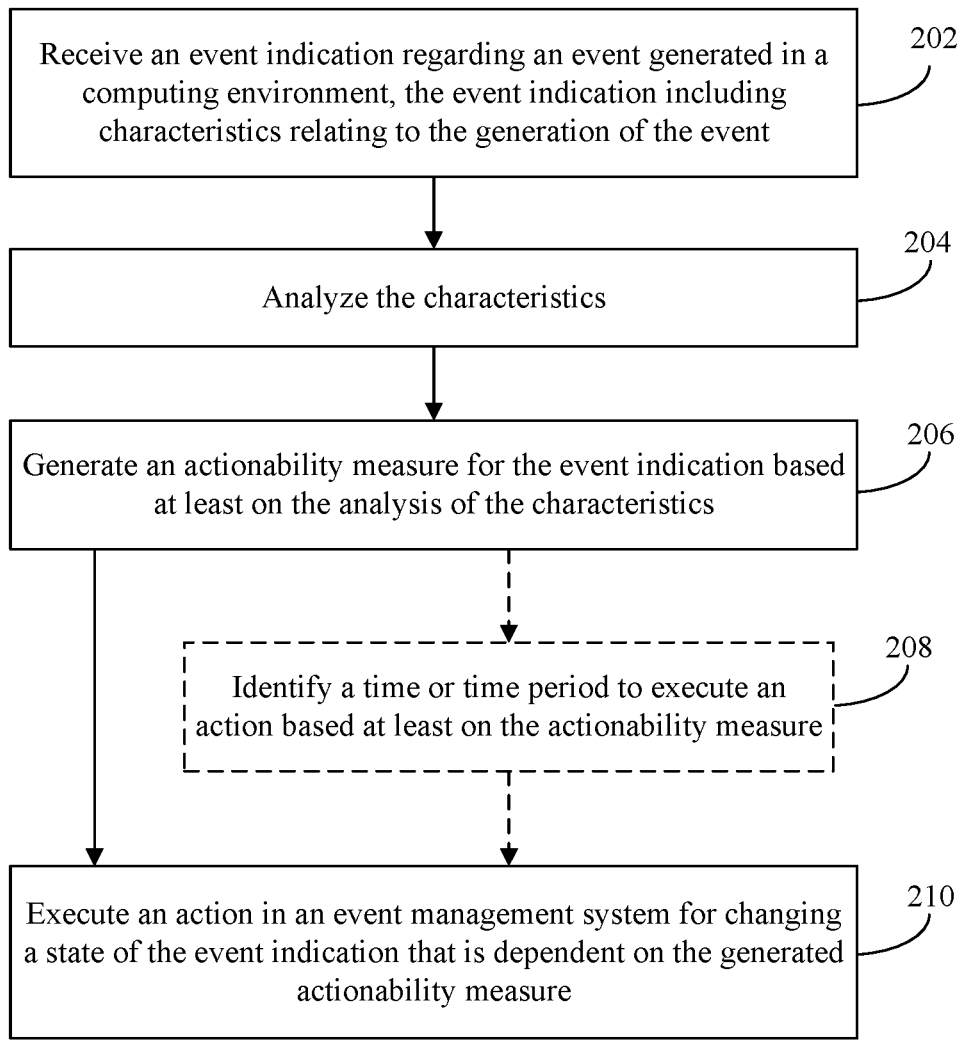
FIG. 2 shows a flowchart of a method for generating an actionability measure, in accordance with an example embodiment.
Figure 3:
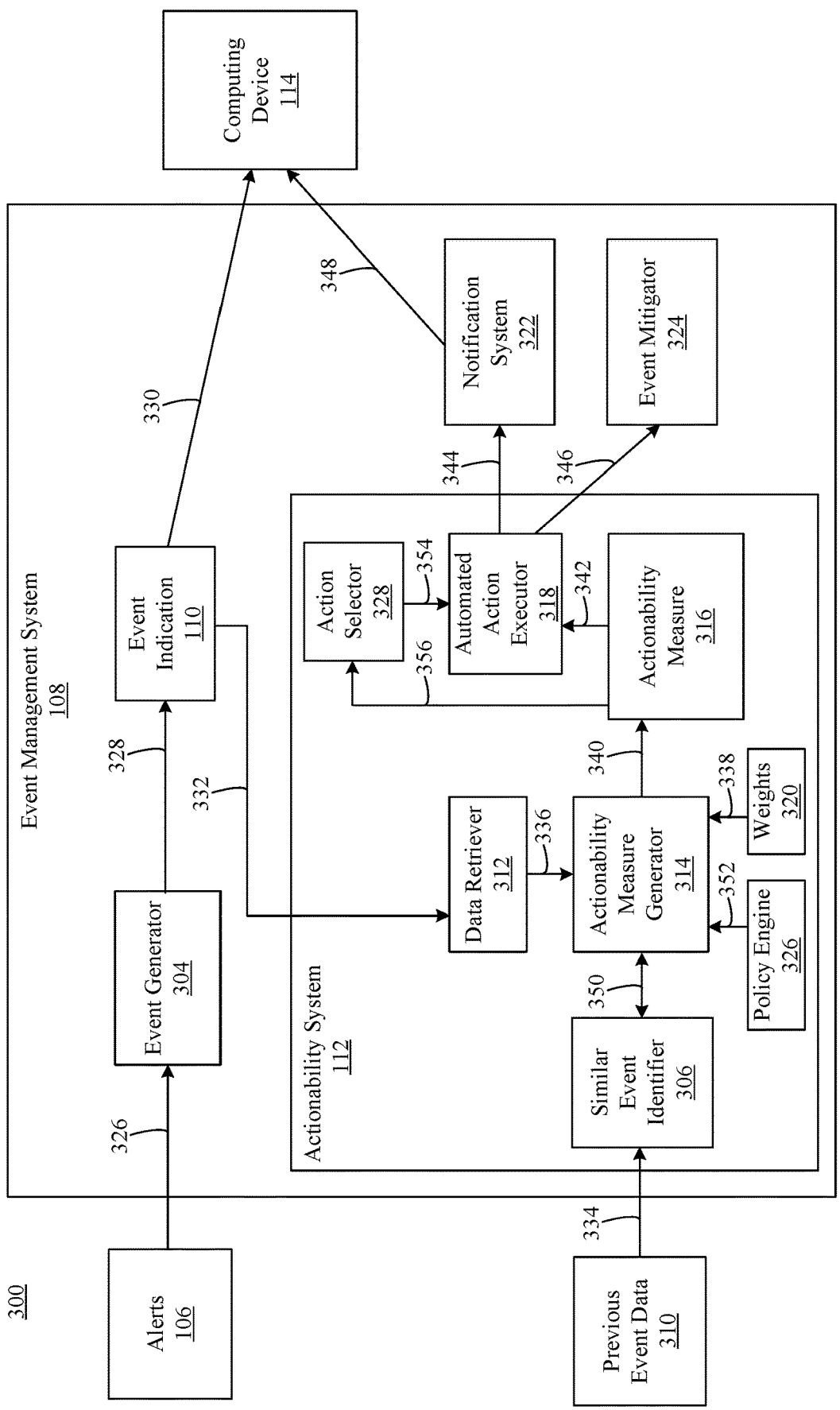
FIG. 3 shows a block diagram of a system in which an actionability measure is implemented, in accordance with an example embodiment.

Actionability system 112 may operate in various ways to generate an actionability measure. For instance, actionability system 112 may operate according to FIG. 2. FIG. 2 shows a flowchart 200 of a method for generating an actionability measure for events occurring in a computing environment, in accordance with an example embodiment. For illustrative purposes, flowchart 200 and actionability system 112 are described as follows with respect to FIG. 3. FIG. 3 shows a block diagram of an example system 300 in which an actionability measure is implemented, in accordance with an example embodiment. As shown in FIG. 3, system 300 includes an example implementation of alerts 106, an example implementation of event management system 108, an example implementation of computing device 114, and previous event data 310. Event management system 108 includes event generator 304, an example implementation of event indication 110, an example implementation of actionability system 112, a notification system 322, and an event mitigator 324. Actionability system 112, as illustrated in FIG. 3, includes a similar event identifier 306, a data retriever 312, an actionability measure generator 314, an actionability measure 316, an automated action executor 318, weights 320, a policy engine 326, and an action selector 328.

Flowchart 200 begins with step 202. In step 202, an event indication regarding an event in the computing environment is received, where the event indication includes characteristics relating to the generation of the event. For instance, with reference to FIG. 3, data retriever 312 of event management system 108 may be configured to retrieve 332 event indication 110 generated in a computing environment, such as an event relating to the health and or performance of monitored resources 102. As described above, event indication 110 may comprise an indication of any type of potentially abnormal activity that is occurring, or has occurred, on monitored resources 102. In some implementations, event indication 110 may be provided 330 to computing device 114 for resolution.

Event indication 110 may be generated by event generator 304. For instance, event generator 304 may obtain 326 alerts 106 (e.g., alerts generated as a result of monitoring of monitored resources 102) and generate 328 event indication 110 therefrom. In some implementations, event generator 304 may optionally implement a correlation engine to attempt to correlate an incoming alert to an active event indication using one or more correlation rules. If a correlation rule applies to the incoming alert and an active parent event indication is identified, the incoming alert may be correlated to the active parent event indication. In other situations, such as where an applicable correlation rule is not located or an active parent event indication does not exist, event generator 304 may generate event indication 110 as a new event indication. It is noted that generation of event indication 110 described above is only intended to be illustrative, and it is understood that event indication 110 may be generated in any other way as appreciated by those skilled in the relevant arts. For instance, it will be appreciated that embodiments described herein need not implement any correlation techniques (e.g., attempting to identify an active parent if it exists), and rather may apply to each individual event indication is generated in the computing environment.

Event indication 110 may comprise any report or other collection of information relating to the generation of an event that is occurring or has occurred in the computing environment. For instance, event indication 110 may include any set of characteristics that identify and/or describe details associated with generation of the event. Such characteristics include, but are not limited to, parameters that indicate how the event was generated, the time that the event occurred, identifying information associated with the affected resource (e.g., a geographic location, a resource name, a customer name, etc.), or any other parameters associated with generation of the event.

In some other examples, the characteristics relating to the generation of the event may also include any information logged by monitoring system 104 relating to performance and/or health metrics of monitored resources 102 (e.g., values of raw signals that were monitored, such as temperatures, CPU usage levels, etc.), an identification of the monitors that led to triggering alert 106, whether the event is correlated with other alerts, an identification of any correlated alerts for the event, an indication of whether the event impacts, or potentially impacts, a user or customer of the monitored resource, whether the monitored resources is in a test mode or is in production, or any other details or factors relating to the environment in which the event occurred (e.g., whether the resource comprises a best effort service or a production service designed to satisfy a service level agreement (SLA), etc.). These characteristics are illustrative only, and event indication 110 may include any additional or any fewer characteristics than those described herein relating to generation of an event.

In step 204, the characteristics relating to the generation of the event are analyzed. For instance, with reference to FIG. 3, actionability measure generator 314 is configured to obtain 336 the characteristics from data retriever 312 and analyze the obtained characteristics. Actionability measure generator 314 may analyze the characteristics in various ways. In some examples, actionability measure generator 314 may identify or extract any information from the characteristics that may indicate an importance, seriousness, reliability, and/or authenticity of event indication 110. As an illustration, actionability measure generator 314 may identify an amount that a threshold has been exceeded (e.g., whether the threshold has been exceeded by a small or large magnitude), a length of time the value was exceeded, how many times the value was exceeded in a given time window, a number of other alerts that are correlated with the same event indication, etc. Actionability measure generator 314 may also be configured to perform any number of statistical or other mathematical operations on any one or more characteristics relating to the generation of the event (e.g., determining an average value of a performance metric for a monitored resource over a period of time).

In step 206, an actionability measure for the event indication is generated based at least on the analysis of the characteristics. In examples, the actionability measure defines an action level for the event indication. For instance, with reference to FIG. 3, actionability measure generator 314 is configured to generate 340 actionability measure 316 based at least on the analysis of the characteristics, where the actionability measure defines an action level for event indication 110. Actionability measure generator 314 may generate actionability measure 316 in various ways. In some implementations, as described above, actionability measure generator 314 may generate actionability measure 316 based at least on the characteristics (or an analysis thereof) included in event indication 110. For instance, based on the analysis of the characteristics, actionability measure 316 may represent a likelihood that event indication 110 was generated due to noise, as a false alarm, as a transient issue (e.g., an issue that is expected to self-heal without any intervention), and/or as an issue that can be resolved with little to no user involvement (e.g., by automatically mitigating the incident). In some other examples, actionability measure 316 may be based at least on whether event indication 110 may comprise other alerts that are correlated with it (e.g., child event indications), which may indicate that the event indication could be a legitimate issue. In other examples, actionability measure 316 may be based on whether the event indication 110 was manually generated (e.g., by a user of monitored resources 102), or automatically via monitoring system 104. For instance, if an issue was raised in the computing environment manually by a user, this may indicate that the event indication is potentially serious in nature and/or impacts a customer, resulting in a higher actionability measure. In other examples, actionability measure 316 may be based on a determination of whether the analysis of the characteristics indicates that event indication 110 (or the monitored signals used to generate the event indication) was reliable and/or complete.

In some example embodiments, actionability measure 316 may be generated for event indication 110 based on a time of day associated with occurrence of the underlying event. However, in some other example embodiments, actionability measure 316 can be generated in other manners, such as generating actionability measure 316 for each individual event indication 110 associated with an underlying issue occurring in the computing environment (e.g., a separate actionability measure may be generated depending on a time of day or any other information or signal described herein available to event management system 108 at the time of generation of the event indication) or may be generated for the underlying issue occurring in the computing environment (e.g., one actionability measure may be assigned to an underlying issue, while another actionability measure may be assigned to an event indication associated with the issue based on a time of day).

In some other implementations, as will be described in greater detail below, actionability measure generator 314 may be configured to generate actionability measure 316 based at least on information associated with previous event data 310, such as by identifying previous event indications that are similar to event indication 110. These examples are only illustrative, and it will be appreciated that actionability measure generator 314 may generate actionability measure 316 based on any one or more characteristics (and/or an analysis thereof) included in event indication 110.

In examples, actionability measure generator 314 may also be configured to generate actionability measure 316 based on any combination (e.g., subset) of characteristics from event indication 110 and/or previous event data 310. For instance, actionability measure generator 314 may be configured to obtain weights 320 for one or more of such characteristics, each weight indicating a weight to apply to each characteristic in generating actionability measure 316. In other words, weights 320 may be utilized by actionability measure generator 314 to weight different characteristics when generating actionability measure 316. In this manner, any appropriate criteria and/or logic may be utilized by actionability measure generator 314 to generate actionability measure 316 for event indication 110.

Actionability measure 316 may comprise metric, such as a score, label, grade, value, rating, etc. that defines an action level for event indication 110. For instance, actionability measure 316 may comprise any combination of integer values and/or letters. In some implementations, actionability measure 316 is one of a plurality of fixed values. For instance, actionability measure may comprise a value of 0 or 1, with 0 indicating that an event indication is not actionable (e.g., does not need immediate attention by an agent), and 1 indicating that the event indication is actionable (e.g., needs attention).

In some other implementations, actionability measure 316 may comprise one of a plurality of values between a minimum actionability measure and a maximum actionability measure (e.g., any value between 0 and 1). For example, actionability measure 316 may comprise a value in a range of values, such as a range of fixed values or a range of variable or dynamic values (e.g., decimals, percentages, etc.). In such examples, the action level of an event indication with a minimum actionability measure may indicate that the event indication is not actionable, while an event indication with a maximum actionability measure indicates that the event indication may need immediate attention (e.g., the issue should be routed to an on-call engineer and/or escalated to a team for immediate resolution). In such examples, values in between the minimum and maximum actionability measure may represent additional action levels based on where on the spectrum the actionability measure falls. In yet other examples, actionability measure 316 may comprise categorical values (e.g., low, medium, high, or any other number and/or granularity of categories) that may define an action level for event indication 110. It is noted and understood that the values (e.g., binary values comprising 0 or 1, a range of values between 0 and 1, categorical values, etc.)

are not intended to be limiting, and any other suitable values or range of values may be implemented.

In some further implementations, actionability measure generator 314 may also be configured to generate actionability measure 316 that comprises a general rating (e.g., a measure that is the same for all agents and/or teams utilizing event management system 108 to resolve event indications), or may be personalized to a particular agent or team. In other words, actionability measure generator 314 may generate actionability measure 316 for a given event indication that is actionable (or comprises a relatively high value) for one user or team, while the same event indication may not be actionable for other users or teams.

In step 208, a time or time period to execute an action in an incident management system based at least on the actionability measure is optionally identified. For instance, with reference to FIG. 3, action selector 328 may be configured to identify a time or time period to execute an action based at least on actionability measure 316. The time or time period may be any specific time of day (e.g., hour, minute, and/or second), a particular day (e.g., the following day or following business day), a range of time (e.g., between normal business hours), or any combination thereof (e.g., execute an action during business hours the following business day). Actions executed in event management system 108 are described in greater detail below with respect to step 210 of FIG. 2.

As discussed earlier, the identified time period may be based at least on actionability measure assigned for event indication 110. For example, if event indication 110 was assigned a relatively low actionability measure, the time to execute an action in the event management system may comprise a delayed time. As an illustration, if an event indication was generated in the middle of the night and actionability measure 316 for the event indication was relatively low (e.g., suggesting that the event indication need not be addressed immediately), action selector 328 may identify the time for executing an action in the event management system as the next business day (and/or during a time window, such as during business hours), rather than indicating that an action should be executed immediately. In other examples, however, such as where the actionability measure may be relatively high, action selector 328 may indicate that the action should be executed immediately (e.g., causing notification system 322 to immediately notify an on-call engineer to address the event indication, even if the event indication was generated in the middle of the night). In this manner, based at least on actionability measure 316 for a given event indication, it may be determined when an appropriate time is for executing an action to handle the event.

It is noted and understood that step 208 is optional in implementations, and therefore need not be performed in some implementations. For instance, in other implementations, the flow may proceed from step 206 to 210, described in greater detail below, without identifying a particular time or time period to execute an action. Further, it will be appreciated to those skilled in the relevant arts that any other techniques described herein (including but not limited to techniques described in flowchart 400, flowchart 500, flowchart 600, and/or flowchart 700) may optionally identify a time or time period to execute an action in event management system 108 based at least on actionability measure 316 for an event indication.

In step 210, an action is executed in the event management system for changing a state of the event indication that is dependent on the generated actionability measure. For instance, with reference to FIG. 3, automated action executor 318 is configured to obtain 342 actionability measure 316 and execute any one or more actions in event management system 108 for changing a state of event indication 110 as selected 354 by action selector 328 where the selected action is dependent on actionability measure 316 generated by actionability measure generator 314. In implementations, automated action executor 318 may execute any appropriate action to change a state of event indication 110, including but not limited to providing and/or modifying how event indication 110 is treated in event management system 108, agent(s) or team(s) that will be assigned to event indication 110, how the agent(s) or team(s) will be notified or any other suitable action that may change any aspect of event indication 110 or how it is handled. For instance, action selector 328 may select a particular type of action based on how low or high actionability measure 316 is, such as by selecting a first type of action if the measure is in a first range (e.g., below 0.1), selecting a second type of action if the measure is in a second range (e.g., between 0.1 to 0.3), selecting a third type of action if the measure is in a third range (e.g., between 0.3 to 0.5), and so on.

For instance, action selector 328 may select an appropriate action based on actionability measure 316 that includes, but is not limited to a manner of notifying an agent or a team (e.g., email, telephone call, text message, push notification in an application, etc.), selecting a time that a notification should be sent (e.g., notifying the agent or team immediately, or delaying the notification until a later time), automatically mitigating the event indication, rerouting the event indication to another agent or team, automatically collecting additional information (e.g. obtaining event logs, or other diagnostic information where actionability measure 316 may be in a certain range), migrating a virtual machine, or any other action that may be taken in event management system 108. As described earlier, any action selected by action selector 328, including but not limited to the illustrative ones described above, may be selected based on the generated actionability measure, such as by selecting a first action if the measure is in a first range (e.g., a low actionability), a second action if the measure is in a second range (e.g., a medium actionability), a third action if the measure is in a third range, and so on.

In further illustrations, automated action executor 318 may also be configured to execute various other actions selected by action selector 328, such as triggering a workflow to resolve event indication 110 (e.g., marking event indication 110 as noise with automated action, or by a single click from an agent) or performing any other action to resolve the event indication such as restarting an affected resource, shutting down a server to prevent damage, etc. In some further example embodiments, automated action executor 318 may comprise an action to automatically mitigate an event indication. For instance, with reference to FIG. 3, automated action execution 318 may be configured to cause 346 event mitigator 324 to automatically mitigate event indication 110, such as where actionability measure 316 is low or indicates that event indication 110 is not actionable. In examples, event mitigator 324 may be configured to automatically update details relating to event indication 110 to provide automatic resolution information, indicate that no resolution actions were needed (e.g., where the issue was a transient issue that self-healed or will self-heal), and provide any notes to be included in a log or the like identifying the reason for automatically mitigating event indication 110.

In this manner, actionability measure generator 314 may generate actionability measure 316 that may be used to, among other things, identify which issues arising in a computing environment should be resolved sooner (e.g., issues that are more important and/or need immediate attention), and which issues can be deferred for later resolution or automatically resolved or mitigated without agent involvement. Further, based on how actionable an event is (e.g., how high an actionability measure is for a given event indication), the most likely set of actions to carry out may be automatically identified and/or executed by automated action executor 318, such as selecting a different notification type to alert an agent or team responsible for handling the event indication.

Accordingly, actionability measure 316 may represent a level of attention required for a given event indication from agents that are responsible for handling the event. For instance, if actionability measure 316 is low or indicates that an event is not actionable, then the underlying issue that led to generation of the event indication may be inferred as not requiring immediate attention, and can be delayed and/or resolved through automatic techniques. Conversely, if actionability measure 316 is high or indicates that an event is actionable, it may be inferred that the event indication needs attention, and the most probably set of actions can be identified, recommended, and/or executed by automated action executor 318 in response, such as transfer the event indication to the correct team or agent, proactively perform automatic diagnostic actions (e.g., collect logs with respect to monitored resources 102 a priori to include in event indication 110 and/or provide to the responding agent or team) such that the event indication may be handled more efficiently. Further, given that several important issues may occur close in time, actionability measure 316 may drive prioritization of work amongst them, such as by causing event indications with a higher actionability measure to be prioritized over event indications with a lower actionability measure.

Figure 4:
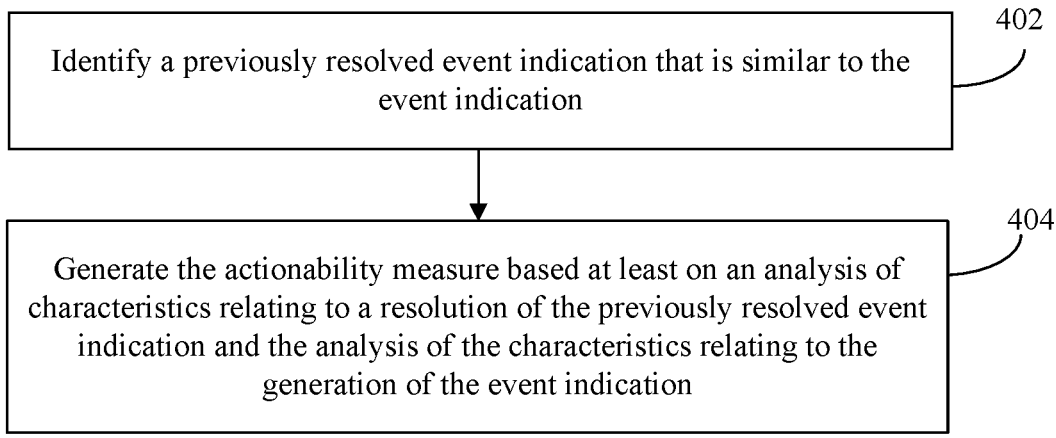
FIG. 4 shows a flowchart of a method for generating an actionability measure based on a previously resolved event, in accordance with an example embodiment.

As described above, actionability measure generator 314 may be configured to generate actionability measure 316 in various ways. For example, FIG. 4 shows a flowchart 400 of a method for generating an actionability measure based on a previously resolved event, in accordance with an example embodiment. In an implementation, the method of flowchart 400 may be implemented by actionability system 112. FIG. 4 is described with continued reference to FIGS. 1 and 3. Other structural and operational implementations will be apparent to persons skilled in the relevant art(s) based on the following discussion regarding flowchart 400, system 100 of FIG. 1, and system 300 of FIG. 3.

Flowchart 400 begins with step 402. In step 402, a previously resolved event indication that is similar to the obtained event indication is identified. For instance, with reference to FIG. 3, similar event identifier 306 may be configured to access 334 previous event data 310 that relates to previously resolved event indications in the computing environment, and identify at least one previously resolved event indication that is similar to event indication 110. Similar event identifier 306 may identify similar event indications in various ways, such as by comparing characteristics relating to event indication 110 and previous event indications and identifying previously resolved event indications with similar characteristics. In some implementations, similar event identifier 306 may comprise one or more machine-learning engines configured to apply a machine-learning model to identify previously event indications from previous event data 310 that are similar to event indication 110. In some examples, similar event identifier 306 may apply one or more of such machine-learning models to identify a plurality of previously resolved event indications (e.g., the top-k number of event indications where k is an integer that may be specified through an administrative console or through any other means, or any number of previously resolved event indications that have a similarity measure above a threshold level). It is noted and understood that similar event identifier 306 is not limited to the illustrative techniques described herein, and may implement any other technique, algorithm, or model to identify one or more previously resolved event indications from previous event data 310 that is similar to event indication 110.

Previous event data 310 may be stored in any suitable repository, such as a data store, for storing historical information associated with the previously resolved event indications. Such a repository may comprise a storage device local to event management system 108, a remotely located storage device, and/or any other type of suitable storage (e.g., a cloud-based storage). Previous event data 310 may comprise any type of information relating to past alerts and/or events generated in a computing environment. For instance, previous event data 310 may include historical information relating to alerts 106 generated by monitoring system 104, or any other information logged by monitoring system 104 relating to performance and/or health metrics of monitored resources 102 (even if alerts 106 were not generated). Previous event data 310 may also include previously resolved event indications, information relating to how each event indication was previously handled (e.g., what actions were taken to resolve and/or mitigate each incident), whether the event indication was handled by a human agent or through automated techniques (e.g., automatic mitigation), whether each event indication was correlated with any other alerts, an identification of any correlated alerts for the event indication, etc.

Previous event data 310 may also include any additional information associated with each event indication, such as a time when each event indication was generated, an identification of the monitors that led to triggering alerts that led to generation of the event indication, an identification of any monitored values that led to triggering the alert or event indication (e.g., the values that exceeded any predefined thresholds), and any other historical information associated with the alert or previously resolved event indication. In some other implementations, previous event data 310 may also indicate, for each previously resolved event indication, a previously generated actionability measure for the event indication.

In step 404, an actionability measure is generated that is based at least on an analysis of characteristics relating to a resolution of the previously resolved event indication and the analysis of the characteristics relating to the generation of the event indication. For instance, with reference to FIG. 3, actionability measure generator 314 may obtain 350 characteristics associated with each of the previously resolved event indications that are similar to event indication 110 and characteristics relating to event indication 110, and analyze such characteristics in generating actionability measure 316. In this manner, actionability measure 316 may be computed based on a broad range of signals such as the similarity of the current event indication with one or more previously resolved event indications that are similar (e.g., determining the actionability of the similar or related issues to compute actionability measure 316 of event indication 110).

In some example implementations, actionability measure generator 314 may generate actionability measure 316 in accordance with one or more policies obtained 352 from policy engine 326. Policy engine 326 may comprise any policy or set of policies that may define a manner in which actionability measure 316 may be generated for an event indication. For instance, policies within policy engine may identify which one or more signals (as described in greater detail below) should be used by actionability measure generator 314 to generate an actionability measure and/or how each signal may be weighted.

In one example, a policy may indicate how previously resolved event indications may factor into generation of an actionability measure for event indication 110. For example, as will be described in greater detail below, similar event identifier 306 may be configured to identify one or more similar events that were previously resolved (e.g., the top-k number of similar event indications). For events that are identified as similar to event indication 110, similar event identifier 306 may also obtain a pre-computed actionability measure for each such similar event. In such an example, policy engine 326 may comprise a policy that specifies that for event indication 110, an actionability measure may be computed based on the actionability measures for the prior similar event indications. For instance, if each of the previously resolved similar event indications were assigned low actionability measures, then event indication 110 may similarly be assigned a low actionability measure by actionability measure generator 314. If one or more of the previous events were assigned high actionability measures, then event indication 110 may be assigned a high actionability measure.

The aforementioned example is not intended to be limiting, and is only intended to illustrate one example of how policy engine 326 may operate. It will be appreciated to those skilled in the relevant arts that policy engine 326 may comprise any policy or policies that may define or otherwise specify how actionability measure generator 314 may generate actionability measure 316 for a given event indication. In implementations, policies of policy engine 326 may be added, deleted, and/or modified in any suitable manner, including but not limited to via a suitable interface (e.g., configuration UI 116).

As described herein, illustrative signals that may be used to generate actionability measure may include factors such as past human effort needed to resolve an event indication, a time to resolve the previous event indication, an impact to users/customers of monitored resources 102 for the previous event indication or event indication 110, a geographic location (e.g., test vs. production) of the previous event indication or event indication 110, and the environment or other factors (e.g., best effort service vs. production service with SLAs) of the previous event indication or event indication 110. Certain illustrative techniques are described below in which characteristics relating to a previously resolved event indication and/or current event indication may be utilized to generate actionability measure 316.

In some examples, characteristics relating to a resolution of the previously resolved event indication may also include any information that may indicate a manner in which the previously event indication was handled, either by manual techniques (e.g., by an agent), or by automated techniques. For instance, characteristics relating to a resolution of a previously resolved event indication may comprise an identification of resolution information for the previously resolved event indication, such as by identifying a resolution action for the previously resolved event indication. In examples, such resolution information may comprise user-specified resolution information that may include postmortem content written by an engineer. Postmortem content may include any information inputted to event management system 108 relating to resolution of a particular event indication, such as an engineer's notes or other input that may explain a reason the event indication was generated, what actions were taken to resolve the event indication (e.g., an identification of commands that had to be executed for debugging, which metrics were analyzed, or other troubleshooting actions that were manually taken), how such event indications may be resolved in the future, etc.

In another example, user-specified resolution information relating to the previously resolved event indication may include any other description entries that identify content written by an engineer and/or whether such content is in a content blacklist. For instance, a content blacklist may comprise a listing of one or more system-generated keywords and/or boilerplate or template language often utilized by engineers. System generated keywords may include, but are not limited to: acknowledging incident, resolving incident, incident created, severity change, incident bridge, updating source field, see parent incident for details, updated parent incident, incident bridge, bridge details, joined the bridge, manually created bridge, deleted bridge, joined the call, was made a parent of, related link added between incident(s), link root cause to incident, etc. In yet some other examples, actionability measure generator 314 may determine that certain non-actionable keywords are present in the user-specified resolution information relating to the previously resolved event indication (e.g., self-healed, selfhealed, self-heal, false alarm, transient, false positive, false alert, intermittent, auto mitigate, etc.), which may suggest that the event indication was generated as a result of noise or is otherwise not actionable.

In the above non-limiting examples, such as where post mortem content was written by an engineer, description entries have content written by an engineer and the content is not in a blacklist, or certain non-actionable keywords are identified for a previously resolved incident indication that is similar to event indication 110, actionability measure generator 314 may determine that event indication 110 is an actionable event and/or should have a relatively higher actionability measure.

Conversely, actionability measure generator 314 may determine that event indication 110 is not an actionable event or should have a relatively lower actionability measure where analysis of the characteristics relating to the resolution of the previous event indication indicates that meaningful human involvement was not utilized to resolve the previous event indication (e.g., a lack of user-specified resolution information associated with the previously resolved event indication). For instance, if actionability measure generator 314 determines that the previous event indication was resolved through automated techniques or included description entries that were not human written (e.g., written by a bot, comprised boilerplate or template language, etc.), then actionability measure 316 may comprise a lower actionability measure.

In some implementations, actionability measure generator 314 is configured to generate actionability measure 316 by assigning different weights 320 to the analysis of the characteristics relating to the resolution of the previously resolved event indication and the analysis of the characteristics relating to generation of the event indication 110. For instance, weights 320 may be applied to weigh characteristics relating to the previously resolved event indication more heavily than characteristics relating to the generation of event indication 110, or vice versa. Such weights may be obtained 338 by actionability measure generator 314, for instance, where certain characteristics relating to the previous and/or current event indication are incomplete, limited, or unreliable, such that different signals should be utilized (or weighed heavier) during generation of actionability measure 316.

Accordingly, characteristics relating to a previously resolved event indication may be assigned one weight value (or a plurality of values for each of a plurality of individual characteristics), while characteristics relating to generation of event indication 110 may be assigned another weight value (or a plurality of values for each of a plurality of individual characteristics). This example is not intended to be limiting, however, as actionability measure generator 314 may be configured to generate actionability measure 316 entirely based on either a previously resolved event indication or information contained within event indication, rather than a combination of both.

Figure 5:
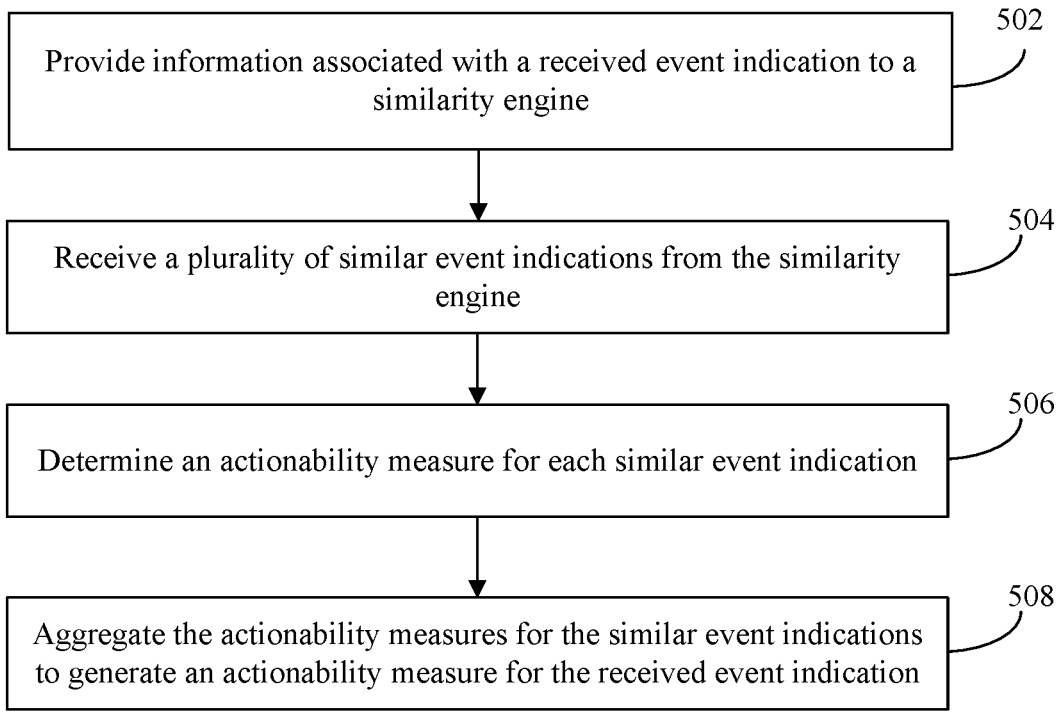
FIG. 5 shows a flowchart of a method for generating an actionability measure based on an aggregation of actionability measures for similar event indications, in accordance with an example embodiment.

In some example embodiments, an actionability measure may be determined based on a plurality of similar event indications. For example, FIG. 5 shows a flowchart of a method for generating an actionability measure based on an aggregation of actionability measures for similar event indications, in accordance with an example embodiment. In an implementation, the method of flowchart 500 may be implemented by actionability system 112. FIG. 5 is described with continued reference to FIGS. 1 and 3. Other structural and operational implementations will be apparent to persons skilled in the relevant art(s) based on the following discussion regarding flowchart 500, system 100 of FIG. 1, and system 300 of FIG. 3.

Flowchart 500 begins with step 502. In step 502, information associated with a received event indication is provided to a similarity engine. For instance, with reference to FIG. 3, actionability measure generator 314 may be configured to provide information associated with event indication 110 to a similarity engine, such as similar event identifier 306, to identify one or more event indications that are similar to event indication 110. In examples, actionability measure generator 314 may invoke similar event identifier 306 in various ways, such as by making a call to similar event identifier 306 though a suitable interface, interacting with similar event identifier 306 using an API, or any other manner as appreciated by those skilled in the relevant arts.

As described earlier, actionability measure generator 314 may provide certain information associated with event indication 110 to similar event identifier 306 to locate one or more similar event indications. In some examples, actionability measure generator 314 may provide one or more of the characteristics described earlier that may describe features of event indication, such as an identification of the affected resource, a location of the affected resource, a monitor that was triggered, or any other information (or combination thereof) that may comprise information descriptive of event indication 110.

In step 504, a plurality of similar event indications are received. For instance, with reference to FIG. 3, actionability measure generator 314 may be configured to receive, from similar event identifier 306, a plurality of event indications that are similar to event indication 110. Similar event identifier 306 may implement any suitable technique for identifying event indications that are similar to event indication 110 as described herein, including but not limited to applying a machine-learning model or the like to output event indications (e.g., from previous event data 310) that may be similar to event indication 110 received by actionability system 112. Similar event identifier 306 may be configured to identify and provide any number of event indications that are similar to event indication 110, such as a predetermined number of event indications (e.g., the top-k similar event indications).

In step 506, an actionability measure is determined for each similar event indication. For instance, with reference to FIG. 3, actionability measure generator 314 may be configured to determine, for each similar event indication received from similar event identifier 306, an actionability measure associated therewith. In some implementations, actionability measure generator 314 may implement similar techniques described herein (e.g., with reference to flowchart 200) compute an actionability measure for each similar event indication by analyzing characteristics associated with the event indication. In some other implementations, actionability measure generator 314 may also receive, from similar event identifier 306, a previously computed actionability measure for each similar event indication (e.g., a historical actionability measure that was computed for the similar event indication that was stored).

In step 508, the actionability measures for the similar event indications are aggregated to generate an actionability measure for the received event indication. For instance, with reference to FIG. 3, actionability measure generator 314 may be configured to aggregate the actionability measures determined for each of the similar event indications (e.g., as described above with respect to step 506) to generate actionability measure 316 for event indication 110. Actionability measure generator 314 may aggregate the actionability measures for the similar event indication in various ways, such as by averaging the actionability measures, selecting a median value, selecting a lowest or highest actionability measure among the actionability measures, or any other technique that may combine or otherwise summarize the set of actionability measures for the similar event indications. Based on the aggregation of actionability measures for the similar event indications, actionability measure generator 314 may generate actionability measure 316 for event indication.

Figure 6:
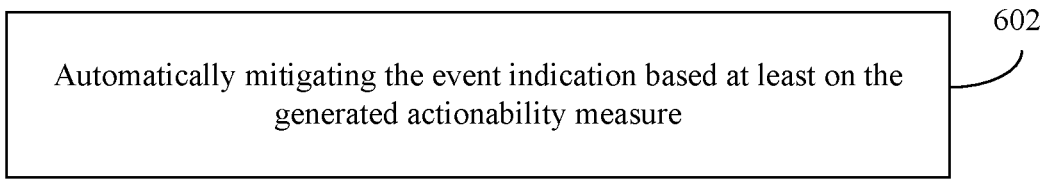
FIG. 6 shows a flowchart of a method for automatically mitigating an event indication based on an actionability measure, in accordance with an example embodiment.

As described above, automated action executor 318 may be configured to automatically handle event indication 110 based on actionability measure 316. For example, FIG. 6 shows a flowchart 600 of a method for automatically mitigating an event indication based on an actionability measure, in accordance with an example embodiment. In an implementation, the method of flowchart 600 may be implemented by automated action executor 318 and/or event mitigator 324. FIG. 6 is described with continued reference to FIGS. 1 and 3. Other structural and operational implementations will be apparent to persons skilled in the relevant art(s) based on the following discussion regarding flowchart 600, system 100 of FIG. 1, and system 300 of FIG. 3.

Flowchart 600 begins with step 602. In step 602, an event indication is automatically mitigated based at least on an actionability measure generated for the event indication. For instance, with reference to FIG. 3, automated action executor 318 may be configured to cause event mitigator 324 to automatically mitigate event indication 110. In examples, automated action executor 318 may cause event indication 110 to be automatically mitigated based on actionability measure 316, such as where the actionability measure is low or otherwise indicates that event indication 110 is not actionable. As described earlier, actionability measure 316 may be low (e.g., below a threshold level for notifying an agent or other on-call engineer) or otherwise indicate that an event indication is not actionable for a variety of reasons, such as where it has been determined that event indication 110 was likely generated due to noise, was a transient issue that will self-heal, etc.

Event mitigator 324 may automatically mitigate event indication 110 in various ways, such as by automatically marking or otherwise annotating event indication 110 (e.g., by including an indication that the event indication was automatically resolved). In some implementations, event mitigator 324 may also provide a reason for automatically mitigating the incident, such as by indicating that the event indication was generated due to noise, was a transient issue, etc. In some other implementations, event mitigator 324 may also annotate event indication 110 by including actionability measure 316 generated for the event indication. In some other implementations, event mitigator 324 may also be configured to change any other state of event indication 110, such as by modifying a severity level associated with the event indication, automatically closing the event indication, or automatically performing any other action to resolve event indication 110 as will be appreciated by those skilled in the relevant arts.

Figure 7:
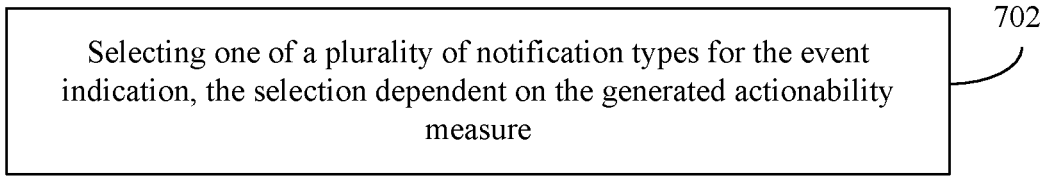
FIG. 7 shows a block diagram of a method for selecting a notification type for an event indication, in accordance with an example embodiment.

As described above, automated action executor 318 may execute a particular action selected by action selector 328 in event management system 108 that is dependent on actionability measure 316 generated for event indication 110. For example, FIG. 7 shows a flowchart 700 of a method for selecting a notification type for an event indication, in accordance with an example embodiment. In an implementation, the method of flowchart 700 may be implemented by action selector 328, automated action executor 318 and/or notification system 322. FIG. 7 is described with continued reference to FIGS. 1 and 3. Other structural and operational implementations will be apparent to persons skilled in the relevant art(s) based on the following discussion regarding flowchart 700, system 100 of FIG. 1, and system 300 of FIG. 3.

Flowchart 700 begins with step 702. In step 702, one of a plurality of notification types is selected for the event indication, the selection of the notification type dependent on the generated actionability measure. For instance, with reference to FIG. 3, action selector 328 may be configured to obtain 356 actionability measure 316 and select one of a plurality of notification types for event indication 110 that is dependent on actionability measure 316. In examples, the selected notification type may be provided 344 by automated action executor 318 to notification system 322, after which notification system 322 may generate the appropriate notification in response and/or provide 348 the notification to a receiving device (e.g., computing device 114).

The plurality of notification types may include, but are not limited to, a notification via a messaging system that is implemented event management system 108, a short message service (SMS) message or other text-based messages, a mobile application PUSH notification, a multimedia messaging service (MMS) message, an email message, an online chat message, a telephone call, or any other type of notification that may be generated via notification system 322. In some other implementations, the selection of one of a plurality of notification types may also include a selection of a particular level of escalation for the notification, such as identifying an individual agent or on-call engineer, a selection of a plurality of agents or engineers, an escalation to an on-call manager or larger group responsible for handling incidents, etc.

In yet other examples, a selection of one of a plurality of notification types may also comprise a selection of a notification time period. For instance, depending on actionability measure 316 and a time of day associated with generation of event indication 110, a different type of notification may be selected. As an illustration, if actionability measure 316 generated for event indication 110 is relatively high (e.g., close to 1 if the actionability measure ranges from 0 to 1, or above a certain threshold), notification system 322 may generate a phone call notification to one or more on-call engineers responsible for the affected resource, even if such a phone call would take place at a late hour (e.g., in the middle of the night). Conversely, if the actionability measure is lower (e.g., lower than a threshold for generating a phone call), notification system 322 may generate a text message or email notification instead of the phone call, such that event indication 110 may be addressed later (e.g., the following day, instead of immediately).

In yet some other examples, automated action executor 318 may be configured to execute an action at a time that is based on actionability measure 316 generated for an event. For instance, automated action executor 318 may be configured to suppress or delay when a notification for an event should be generated based on an actionability measure. As an illustration, if actionability measure 316 for an event indication comprises a low actionability measure, automated action executor 318 may be configured to cause notification system 322 to generate a notification if the event occurred during a certain time (or time window), such as during normal business hours, during weekdays, etc. In such examples, where the actionability measure is low, notifications may be suppressed or delayed (e.g., if the event indication was generated in the middle of the night) until a later time, such as the next day, which may improve overall productivity by not disturbing engineers for issues that may not need immediate resolution. In other examples, however, such as where the actionability measure is high, automated action executor 318 may be configured to cause notification system 322 to provide notifications to agents immediately (e.g., even if an event occurred in the middle of the night). In this manner, notification system 322 may provide the notification (e.g., to an on-call engineer or any other agent or system) at a time that is dependent on actionability measure 316 generated for an incident.

In some further implementations, notification system 322 may also be configured to provide one or more recommended actions to resolve the event indication in addition to notifying the responsible agent, such as one or more actions that may resolve or close the event indication automatically (e.g., acknowledging the event indication, marking it as non-customer impacting, mitigating the event indication as noise, updating a setting in monitoring system 104, creating or populating any annotation fields relating to the resolution of event indication 110, etc.). In some examples, notification system 322 may also be configured to recommend an orchestrated set of actions (e.g., as a workflow) based on actionability measure 316 that may be carried out by a single user action (e.g., a single click of a mouse), upon which event indication 110 may automatically be resolved or closed. In some implementations, notification system 322 may also be configured to provide the generated actionability measure for presentation to a user. However, the measure need not be provided for presentation to a user in all implementations.

It is noted that the above systems and methods are not intended to be limiting. Persons skilled in the relevant art(s) will understand that the all of the techniques described herein may be extended to any issues (e.g., IT issues) in a computing environment. Furthermore, because the techniques may be extended to any IT tasks, persons skilled in the relevant art(s) will understand that the events and/or event indications described herein can relate to any event occurring in a computing environment.

III. Example Computer System Implementation

Monitored resources 102, monitoring system 104, alerts 106, event management system 108, event indication 110, actionability system 112, computing device 114, configuration UI 116, incident resolver UI 118, event generator 304, similar incident identifier 306, previous event data 310, data retriever 312, actionability measure generator 314, actionability measure 316, automated action executor 318, weights 320, notification system 322, event mitigator 324, policy engine 326, action selector 328, flowchart 200, flowchart 400, flowchart 500, flowchart 600, and/or flowchart 700 may be implemented in hardware, or hardware combined with one or both of software and/or firmware. For example, monitored resources 102, monitoring system 104, alerts 106, event management system 108, event indication 110, actionability system 112, computing device 114, configuration UI 116, incident resolver UI 118, event generator 304, similar incident identifier 306, previous event data 310, data retriever 312, actionability measure generator 314, actionability measure 316, automated action executor 318, weights 320, notification system 322, event mitigator 324, policy engine 326, action selector 328, flowchart 200, flowchart 400, flowchart 500, flowchart 600, and/or flowchart 700 may be implemented as computer program code/instructions configured to be executed in one or more processors and stored in a computer readable storage medium.

Alternatively, monitored resources 102, monitoring system 104, alerts 106, event management system 108, event indication 110, actionability system 112, computing device 114, configuration UI 116, incident resolver UI 118, event generator 304, similar incident identifier 306, previous event data 310, data retriever 312, actionability measure generator 314, actionability measure 316, automated action executor 318, weights 320, notification system 322, event mitigator 324, policy engine 326, action selector 328, flowchart 200, flowchart 400, flowchart 500, flowchart 600, and/or flowchart 700 may be implemented as hardware logic/electrical circuitry.

For instance, in an embodiment, one or more, in any combination, of monitored resources 102, monitoring system 104, alerts 106, event management system 108, event indication 110, actionability system 112, computing device 114, configuration UI 116, incident resolver UI 118, event generator 304, similar incident identifier 306, previous event data 310, data retriever 312, actionability measure generator 314, actionability measure 316, automated action executor 318, weights 320, notification system 322, event mitigator 324, policy engine 326, action selector 328, flowchart 200, flowchart 400, flowchart 500, flowchart 600, and/or flowchart 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
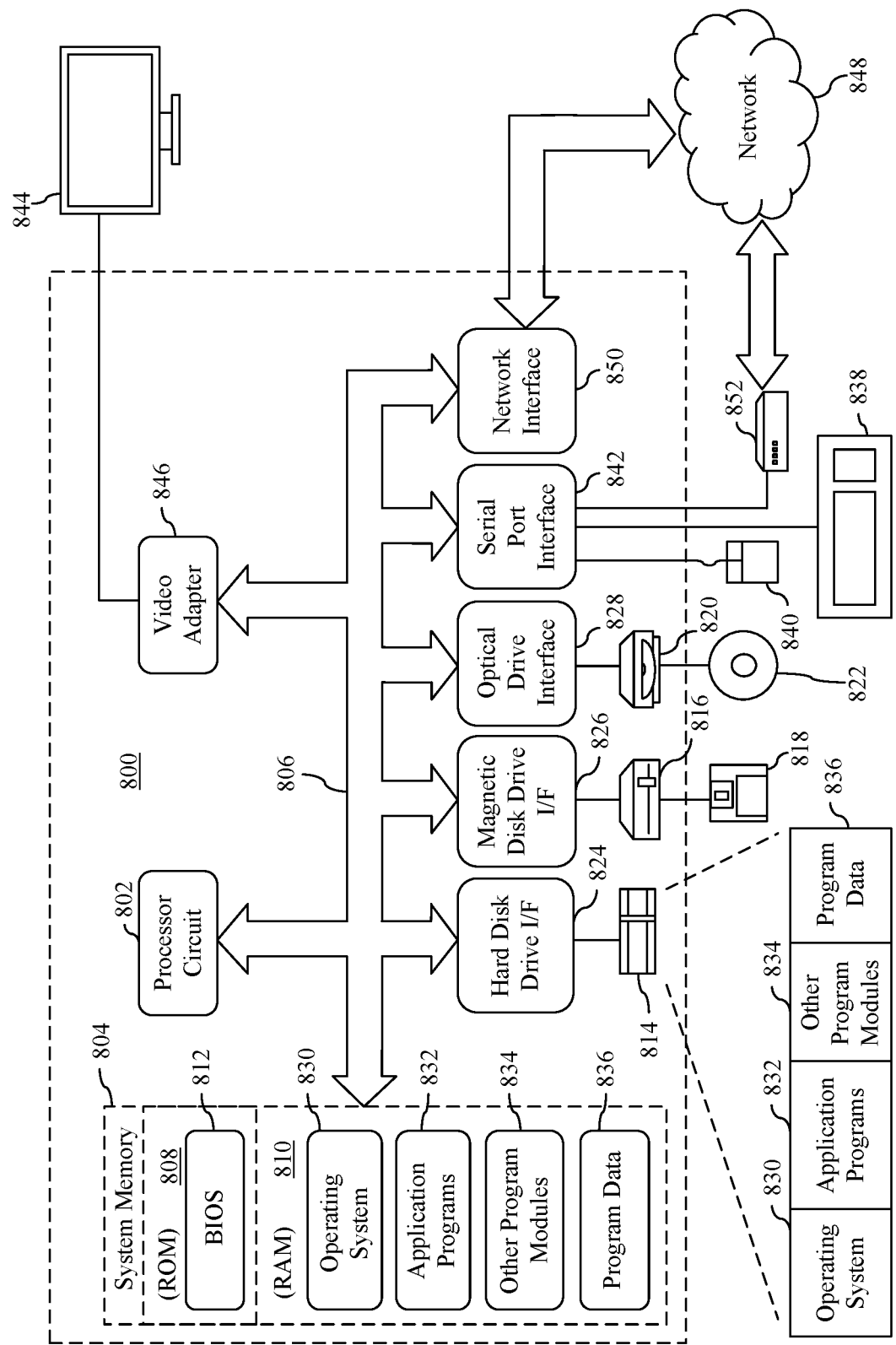
FIG. 8 is a block diagram of an example processor-based computer system that may be used to implement various embodiments.

FIG. 8 depicts an exemplary implementation of a computing device 800 in which embodiments may be implemented. For example, monitored resources 102, monitoring system 104, alerts 106, event management system 108, event indication 110, actionability system 112, computing device 114, configuration UI 116, incident resolver UI 118, event generator 304, similar incident identifier 306, previous event data 310, data retriever 312, actionability measure generator 314, actionability measure 316, automated action executor 318, weights 320, notification system 322, event mitigator 324, policy engine 326, action selector 328, flowchart 200, flowchart 400, flowchart 500, flowchart 600, and/or flowchart 700 (and/or any of the steps of flowcharts 200, 400, 500, 600, and 700 described therein) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of monitored resources 102, monitoring system 104, alerts 106, event management system 108, event indication 110, actionability system 112, computing device 114, configuration UI 116, incident resolver UI 118, event generator 304, similar incident identifier 306, previous event data 310, data retriever 312, actionability measure generator 314, actionability measure 316, automated action executor 318, weights 320, notification system 322, event mitigator 324, policy engine 326, action selector 328, flowchart 200, flowchart 400, flowchart 500, flowchart 600, and/or flowchart 700 and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for generating an actionability measure for events occurring in a computing environment is disclosed herein. The system includes: at least one processor circuit; and at least one memory that stores program code configured to be executed by the at least one processor circuit, the program code comprising: a data retriever configured to receive, in an event management system, an event indication regarding an event generated in the computing environment, the event indication including characteristics relating to the generation of the event; an actionability measure generator configured to: analyze the characteristics, and generate an actionability measure for the event indication based at least on the analysis of the characteristics, the actionability measure defining an action level for the event indication; and an automated action executor configured to execute an action in the event management system for changing a state of the event indication that is dependent on the generated actionability measure.

In one implementation of the foregoing system, the actionability measure comprises one of a plurality of values between a minimum actionability measure and a maximum actionability measure.

In another implementation of the foregoing system, the actionability measure generator is configured to: identify a previously resolved event indication that is similar to the event indication; and generate the actionability measure based at least on an analysis of characteristics relating to a resolution of the previously resolved event indication and the analysis of the characteristics relating to the generation of the event indication.

In another implementation of the foregoing system, the actionability measure generator is configured to generate the actionability measure by assigning different weights to the analysis of the characteristics relating to the resolution of the previously resolved event indication and the analysis of the characteristics relating to the generation of the event indication.

In another implementation of the foregoing system, the characteristics relating to the resolution of the previously resolved event indication comprise an identification of a resolution action for the previously resolved event indication.

In another implementation of the foregoing system, the executed action comprises automatically mitigating the event indication.

In another implementation of the foregoing system, the automated action executor is configured to select one of a plurality of notification types for the event indication, the selection of the notification type dependent on the generated actionability measure.

In another implementation of the foregoing system, the automated action executor is further configured to execute the action at a time that is based on the generated actionability measure.

A method for generating an actionability measure for events occurring in a computing environment is disclosed herein. The method includes: receiving, in an event management system, an event indication regarding an event generated in the computing environment, the event indication including characteristics relating to the generation of the event; analyzing the characteristics; generating an actionability measure for the event indication based at least on the analysis of the characteristics, the actionability measure defining an action level for the event indication; and executing an action in the event management system for changing a state of the event indication that is dependent on the generated actionability measure.

In one implementation of the foregoing method, the actionability measure comprises one of a plurality of values between a minimum actionability measure and a maximum actionability measure.

In another implementation of the foregoing method, the method further includes identifying a previously resolved event indication that is similar to the event indication; and generating the actionability measure based at least on an analysis of characteristics relating to a resolution of the previously resolved event indication and the analysis of the characteristics relating to the generation of the event indication.

In another implementation of the foregoing method, the generating the actionability measure comprises assigning different weights to the analysis of the characteristics relating to the resolution of the previously resolved event indication and the analysis of the characteristics relating to the generation of the event indication.

In another implementation of the foregoing method, the characteristics relating to the resolution of the previously resolved event indication comprise an identification of a resolution action for the previously resolved event indication.

In another implementation of the foregoing method, the executed action comprises automatically mitigating the event indication.

In another implementation of the foregoing method, executing the action comprises: selecting one of a plurality of notification types for the event indication, the selection of the notification type dependent on the generated actionability measure.

In another implementation of the foregoing method, executing the action comprises: executing the action at a time that is based on the generated actionability measure.

A computer-readable storage medium is disclosed herein. The computer-readable store medium has program instructions recorded thereon that, when executed by at least one processor of a computing device, perform a method, the method comprising: receiving, in an event management system, an event indication regarding an event generated in the computing environment, the event indication including characteristics relating to the generation of the event; analyzing the characteristics; generating an actionability measure for the event indication based at least on the analysis of the characteristics, the actionability measure defining an action level for the event indication; and executing an action in the event management system for changing a state of the event indication that is dependent on the generated actionability measure.

In one implementation of the foregoing computer-readable storage medium, the method further comprises: identifying a previously resolved event indication that is similar to the event indication; and generating the actionability measure based at least on an analysis of characteristics relating to a resolution of the previously resolved event indication and the analysis of the characteristics relating to the generation of the event indication.

In another implementation of the foregoing computer-readable storage medium, the generating the actionability measure comprises assigning different weights to the analysis of the characteristics relating to the resolution of the previously resolved event indication and the analysis of the characteristics relating to the generation of the event indication.

In another implementation of the foregoing computer-readable storage medium, the executing the action comprises: selecting one of a plurality of notification types for the event indication, the selection of the notification type dependent on the generated actionability measure.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for generating an actionability measure for events occurring in a computing environment, comprising:
   at least one processor circuit; and
   at least one memory that stores program code configured to be executed by the at least one processor circuit, the program code comprising:
      a data retriever configured to receive, in an event management system, an event indication regarding an event generated in the computing environment, the event indication including characteristics relating to the generation of the event;
      an actionability measure generator configured to:
         analyze the characteristics, and
         generate an actionability measure for the event indication based at least on the analysis of the characteristics, the actionability measure defining an action level for the event indication; and
      an automated action executor configured to execute an action in the event management system for changing a state of the event indication that is dependent on the generated actionability measure.

2. The system of claim 1, wherein the actionability measure comprises one of a plurality of values between a minimum actionability measure and a maximum actionability measure.

3. The system of claim 1, wherein the actionability measure generator is configured to:
   identify a previously resolved event indication that is similar to the event indication; and
   generate the actionability measure based at least on an analysis of characteristics relating to a resolution of the previously resolved event indication and the analysis of the characteristics relating to the generation of the event indication.

4. The system of claim 3, wherein the actionability measure generator is configured to generate the actionability measure by assigning different weights to the analysis of the characteristics relating to the resolution of the previously resolved event indication and the analysis of the characteristics relating to the generation of the event indication.

5. The system of claim 3, wherein the characteristics relating to the resolution of the previously resolved event indication comprise an identification of a resolution action for the previously resolved event indication.

6. The system of claim 1, wherein the executed action comprises automatically mitigating the event indication.

7. The system of claim 1, wherein the automated action executor is configured to: select one of a plurality of notification types for the event indication, the selection of the notification type dependent on the generated actionability measure.

8. The system of claim 1, wherein the automated action executor is further configured to:
execute the action at a time that is based on the generated actionability measure.

9. A method for generating an actionability measure for events occurring in a computing environment, comprising:
receiving, in an event management system, an event indication regarding an event generated in the computing environment, the event indication including characteristics relating to the generation of the event;
analyzing the characteristics;
generating an actionability measure for the event indication based at least on the analysis of the characteristics, the actionability measure defining an action level for the event indication; and
executing an action in the event management system for changing a state of the event indication that is dependent on the generated actionability measure.

10. The method of claim 9, wherein the actionability measure comprises one of a plurality of values between a minimum actionability measure and a maximum actionability measure.

11. The method of claim 9, further comprising:
identifying a previously resolved event indication that is similar to the event indication; and
generating the actionability measure based at least on an analysis of characteristics relating to a resolution of the previously resolved event indication and the analysis of the characteristics relating to the generation of the event indication.

12. The method of claim 11, wherein the generating the actionability measure comprises:
assigning different weights to the analysis of the characteristics relating to the resolution of the previously resolved event indication and the analysis of the characteristics relating to the generation of the event indication.

13. The method of claim 11, wherein the characteristics relating to the resolution of the previously resolved event indication comprise an identification of a resolution action for the previously resolved event indication.

14. The method of claim 9, wherein the executed action comprises automatically mitigating the event indication.

15. The method of claim 9, wherein the executing the action comprises:
selecting one of a plurality of notification types for the event indication, the selection of the notification type dependent on the generated actionability measure.

16. The method of claim 9, wherein the executing the action comprises: executing the action at a time that is based on the generated actionability measure.

17. A computer-readable storage medium having program instructions recorded thereon that, when executed by at least one processor of a computing device, perform a method, the method comprising:
receiving, in an event management system, an event indication regarding an event generated in the computing environment, the event indication including characteristics relating to the generation of the event;
analyzing the characteristics;
generating an actionability measure for the event indication based at least on the analysis of the characteristics, the actionability measure defining an action level for the event indication; and
executing an action in the event management system for changing a state of the event indication that is dependent on the generated actionability measure.

18. The computer-readable storage medium of claim 17, wherein the method further comprises:
identifying a previously resolved event indication that is similar to the event indication; and
generating the actionability measure based at least on an analysis of characteristics relating to a resolution of the previously resolved event indication and the analysis of the characteristics relating to the generation of the event indication.

19. The computer-readable storage medium of claim 18, wherein the generating the actionability measure comprises:
assigning different weights to the analysis of the characteristics relating to the resolution of the previously resolved event indication and the analysis of the characteristics relating to the generation of the event indication.

20. The computer-readable storage medium of claim 17, wherein the executing the action comprises:
selecting one of a plurality of notification types for the event indication, the selection of the notification type dependent on the generated actionability measure.

* * * * *